United States Patent
Cunningham et al.

(10) Patent No.: US 6,347,293 B1
(45) Date of Patent: Feb. 12, 2002

(54) SELF-CHARACTERIZING VIBRATING CONDUIT PARAMETER SENSORS AND METHODS OF OPERATION THEREFOR

(75) Inventors: Timothy J. Cunningham, Boulder, CO (US); Stuart J. Shelley, Cincinnati, OH (US)

(73) Assignee: Micro Motion, Inc., Boulder, CO (US)

(*) Notice: Subject to any disclaimer, the term of this patent is extended or adjusted under 35 U.S.C. 154(b) by 0 days.

(21) Appl. No.: 09/350,844

(22) Filed: Jul. 9, 1999

(51) Int. Cl.$^7$ ............................ G01F 1/00; G01F 25/00
(52) U.S. Cl. ................... 702/189; 702/100; 702/45; 73/861.355; 73/861.356
(58) Field of Search ........................ 702/45, 47, 56, 702/100, 104, 189; 73/861.355, 861.356, 861.357, 1.31, 1.34

(56) References Cited

U.S. PATENT DOCUMENTS

| | | | |
|---|---|---|---|
| 5,009,109 A | * 4/1991 | Kalotay et al. | 73/861.356 |
| 5,301,557 A | * 4/1994 | Cage et al. | 73/861.355 |
| 5,734,112 A | * 3/1998 | Bose et al. | 73/861.56 |
| 6,233,526 B1 | * 5/2001 | Cunningham | 702/45 |
| 6,249,752 B1 | * 6/2001 | Cunningham et al. | 702/100 |

FOREIGN PATENT DOCUMENTS

| | | |
|---|---|---|
| WO | WO 99/02945 | 1/1999 |
| WO | WO 99/28708 | 6/1999 |
| WO | WO 00/04345 | 1/2000 |

* cited by examiner

Primary Examiner—Patrick Assouad
Assistant Examiner—Bryan Bui
(74) Attorney, Agent, or Firm—Chrisman, Bynum & Johnson, P.C.

(57) ABSTRACT

A self-characterizing vibrating conduit sensor for measuring a process parameter in a material processing system includes a conduit configured to contain material from the material processing system and a plurality of motion transducers operative to produce a plurality of motion signals representing motion at a plurality of locations on the conduit. A modal parameter estimator is configured to receive the plurality of motion signals and operative to estimate a modal parameter from the received plurality of motion signals. The modal parameter, e.g., a modal filter parameter or a force projection parameter, relates behavior of the conduit to behavior of a single degree of freedom (SDOF) system. A process parameter estimator is configured to receive the plurality of motion signals, responsive to the modal parameter estimator and operative to estimate a process parameter associated with a material in the conduit from the received plurality of motion signals according to the estimated modal parameter. Techniques for estimating a modal parameter include a modified reciprocal modal vector (MRMV) estimation technique and an adaptive modal filtering technique.

34 Claims, 9 Drawing Sheets

SELF-CHARACTERIZING VIBRATING CONDUIT PARAMETER SENSORS AND METHODS OF OPERATION THEREFOR

BACKGROUND OF THE INVENTION

1. Field of the Invention

This invention pertains to process parameter sensors and methods of operation therefor, and more particularly, to vibrating conduit parameter sensors and methods of operation therefor.

2. Statement of the Problem

Coriolis effect mass flowmeters are commonly used to measure mass flow and other information for materials flowing through a conduit. Exemplary Coriolis flowmeters are disclosed in U.S. Pat. No. 4,109,524 of Aug. 29, 1978, U.S. Pat. No. 4,491,025 of Jan. 1, 1985, and RE 31,450 of Feb. 11, 1982, all to J. E. Smith et al. These flowmeters typically include one or more conduits having a straight or a curved configuration. Each conduit may be viewed as having a set of vibration modes, including, for example, simple bending, torsional, radial and coupled modes. In a typical mass flow measurement application, each conduit is driven to oscillate at resonance in one of its natural modes as a material flows through the conduit. The vibration modes of the vibrating, material-filled system are effected by the combined mass and stiffness characteristics of the conduits and the characteristics of the material flowing within the conduits.

A typical component of a Coriolis flowmeter is the drive or excitation system. The drive system operates to apply a periodic physical force to the conduit that causes the conduit to oscillate. The drive system typically includes at least one actuator mounted to the conduit(s) of the flowmeter. The actuator typically comprises one of many well known electromechanical devices, such as a voice coil device having a magnet mounted to a first conduit and a wire coil mounted to a second conduit, in an opposing relationship to the magnet. A drive circuit continuously applies a periodic, e.g., a sinusoidal or square wave, drive signal to the actuator coil. The periodic drive signal causes the actuator to drive the two conduits in an opposing periodic pattern that is thereafter maintained.

When there is effectively "zero" flow through a driven flowmeter conduit, points along the conduit tend to oscillate with approximately the same phase or a "zero-flow" phase with respect to the driver, depending on the mode of the driven vibration. As material begins to flow from an inlet of the flowmeter, through the conduit and out of an outlet of the flowmeter, Coriolis forces arising from the material flow tend to induce phase shifts between spatially separate points along the conduit. Generally, as material flows through the conduit, the phase on the inlet side of the conduit lags the driver, while the phase on the outlet side of the conduit leads the driver. The phase shift induced between two locations on the conduit is approximately proportional to the mass flow rate of material through the conduit.

Motion of a Coriolis flowmeter can be modeled as a superposition of a plurality of vibrational modes, i.e., as motion of a plurality of independent single degree of freedom (SDOF) systems, a respective SDOF system being characterized by a natural frequency and a damping. A typical one of the modes present in a dual-conduit Coriolis flowmeter is the first out-of-phase bending mode, e.g., a bending mode in which the two tubes of the Coriolis flowmeter vibrate in opposition to one another. Other modes may also be identified in a typical vibrating conduit Coriolis flowmeter, including a first out of phase twist mode which is generally attributable to Coriolis forces generated by material passing through the conduits, as well as in-phase, lateral and other vibrational modes excited by the actuator of the flowmeter and other vibrational sources coupled to the flowmeter.

Techniques have been proposed to produce drive signals that produce a desired modal response. U.S. patent application Ser. No. 08/890,785 to Cunningham, assigned to the assignee of the present application, describes derivation of force projection coefficients that produce a drive signal for an actuator that preferentially excites a desired vibrational mode. A related United States Patent Application entitled "Generalized Modal Space Drive Control System for a Vibrating Tube Process Parameter Sensor," to Cunningham, filed on Feb. 25, 1998 and also assigned to the assignee of the present application, describes generating drive signals for a number of actuators to preferentially excite one or more desired modes of a Coriolis flowmeter conduit.

The above-referenced techniques typically use a predetermined modal filter to generate force projection coefficients. The predetermined modal filter is typically generated offline using classic experimental modal analysis techniques or finite element modeling. The force projection coefficients may then be determined from the modal filter using trial and error, inverse modal transformation or other techniques.

Unfortunately, the predetermined modal filter may not take into account changes in sensor characteristics that may occur over time. In addition, conventional techniques may not account for in situ effects arising from interactions between the sensor and the material processing system in which it is operated. For example, additional modes may be excited by structural coupling with the material processing system or by vibration sources in the material processing system, such as pumps.

SUMMARY OF THE INVENTION

In light of the foregoing, it is an object of the present invention to provide self-characterizing vibrating conduit type parameter sensors and methods of operation therefor which can provide a more accurate estimate of a process parameter, e.g., mass flow, of a material processing system.

It is another object of the present invention to provide vibrating conduit type parameter sensors and methods of operation therefor which can provide more accurate characterization of sensor behavior.

It is yet another object of the present invention to provide vibrating conduit type parameter sensors and methods of operation therefor which are capable of in situ characterization of sensor behavior.

These and other objects, features and advantages are provided according to the present invention by self-characterizing vibrating conduit type parameter sensors which include a modal parameter estimator configured to receive motion signals representing motion of the sensor conduit at a plurality of locations and operative to estimate a modal parameter, e.g., a modal filter parameter or a force projection parameter, from the received motion signals. According to a modified reciprocal modal vector (MRMV) aspect of the present invention, a modal filter parameter is estimated by exciting the conduit over a range of frequencies, generating a frequency response function (FRF) matrix over the range of frequencies, and generating an estimate of the modal filter parameter from the FRF matrix. The estimate of the modal filter parameter may be generated during an initialization or calibration procedure. According to an adaptive modal filtering aspect, an error of an estimated modal response of a modal filter with respect to a reference modal response is determined, and the error is used to generate a new estimate of a modal filter parameter for the modal filter. Modal filter parameters and force projection parameters can thus be adaptively updated while the sensor is in operation.

In particular, according to the present invention, a self-characterizing sensor for measuring a process parameter for a material processing system includes a conduit configured to contain material from the material processing system and a plurality of motion transducers operative to produce a plurality of motion signals representing motion at a plurality of locations on the conduit. A modal parameter estimator is configured to receive the plurality of motion signals and operative to estimate a modal parameter from the received plurality of motion signals. The modal parameter, e.g., a modal filter parameter or a force projection parameter, relates behavior of the conduit to behavior of a single degree of freedom (SDOF) system. A process parameter estimator is configured to receive the plurality of motion signals, responsive to the modal parameter estimator and operative to estimate a process parameter for the material processing system from the received plurality of motion signals according to the estimated modal parameter.

According to a modified reciprocal modal vector (MRMV) estimation aspect of the present invention, a sensor conduit is excited over a range of frequencies. A plurality of motion signals representing motion in response to the excitation is received, and a plurality of frequency responses for the plurality of locations over the range of frequencies is determined from the received plurality of motion signals. An estimate of a modal filter parameter for the sensor is generated from the determined plurality of frequency responses. A frequency response function (FRF) matrix is generated from the plurality of frequency responses. A pole corresponding to a mode of the sensor is identified and an SDOF vector generated from the identified pole. An estimate of a modal filter parameter is then generated from the estimated FRF matrix and the estimated SDOF vector.

According to an adaptive modal filtering aspect of the present invention, an excitation applied to a sensor conduit is determined and applied to a reference modal system to generate a reference modal response. A modal filter is applied to the plurality of motion signals representing motion in response to the excitation to generate an estimated modal response according to an estimate of the modal filter parameter. A new estimate of the modal filter parameter is generated based on an error of the estimated modal response with respect to the reference modal response. New estimates of the modal parameter may be iteratively generated until an error of the estimated modal response with respect to the reference modal response meets a predetermined criterion. Improved parameter sensors and operating methods therefor may thereby be provided.

DETAILED DESCRIPTION OF EMBODIMENTS

Figure 1:
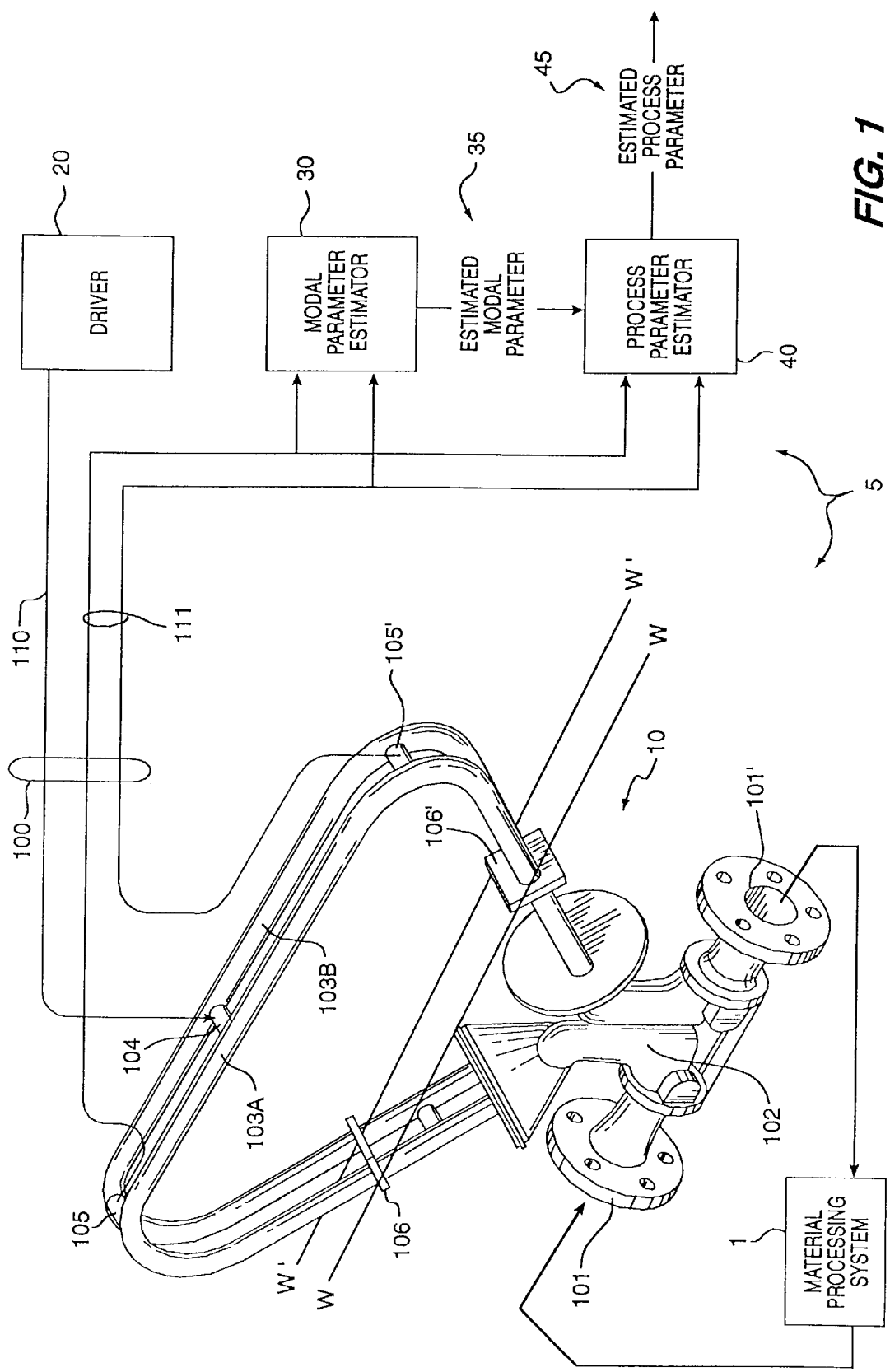
FIG. 1 illustrates an embodiment of a parameter sensor according to the present invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

The following discussion refers to Coriolis flowmeters in which a process parameter of a material processing system, typically mass flow rate, is estimated for a material, e.g., a fluid, flowing through a vibrating conduit configured to contain a material which passes through the vibrating conduit as part of the material processing system. Those skilled in the art will appreciate, however, that the present invention is also applicable to vibrating conduit process parameter sensors other than in-line sensors. For example, present invention is applicable to sampling-type vibrating-tube densitometers which include a conduit configured to contain a sample of a material extracted from a material processing system.

FIG. 1 illustrates an exemplary embodiment of a process parameter sensor according to the present invention. The parameter sensor 5 includes a conduit assembly 10. The conduit assembly 10 includes an inlet flange 101, an outlet flange 101', a manifold 102 and first and second conduits 103A, 103B. Brace bars 106, 106' connect the conduits 103A, 103B. Connected to the flow conduits 103A, 103B is an actuator 104 and first and second motion transducers 105, 105', connected to leads 100. The actuator 104 is operative to vibrate the conduits 103A, 103B responsive to a drive signal supplied by a driver 20 on a drive lead 110. The first and second motion transducers 105, 105' are operative to produce motion signals representing motion at spatially separate locations on the conduits 103A, 104B on transducer leads 111. The first and second motion tranducers 105, 105' may include a variety of devices, such as coil-type displacement tranducers, optical or ultrasonic motion sensors, accelerometer, inertial rate sensors and the like.

When the conduit assembly 10 is inserted into a material processing system 1, material flowing in the pipeline material processing system 1 enters the conduit assembly 10 through the inlet flange 101. The material then flows through the manifold 102, where it is directed into the flow tubes 103A, 103B. After leaving the flow tubes 103A, 103B, the material flows back into the manifold 102 and exits the meter assembly 10 through the outlet flange 101'. As the material flows through the conduits 103A, 103B, it gives rise to Coriolis forces that perturb the conduits 103A, 103B.

The conduits 103A, 103B are typically driven by the actuator 104 in opposite directions about their respective bending axes W—W and W'—W', inducing what is commonly referred to as a first out of phase bending mode in the conduit assembly 10. The actuator 104 may comprise any one of many well known devices, such as linear actuator including a magnet mounted to the first conduit 103A and an opposing coil mounted to the second flow tube 103B. An alternating current induced by a drive signal provided by the driver 20 via the drive lead 110 passes through the coil, generating mechanical force that vibrates the conduits 103A, 103B. Although the parameter sensor 5 illustrated in FIG. 1 is shown as including an integral actuator 104, those skilled in the art will appreciate that vibration of the conduits 103A, 103B according to the present invention may be achieved by other techniques, such as by an excitation generated external to the conduit assembly 10 and conveyed to the conduit assembly 10 via a fluid or a mechanical coupling.

Behavior of a parameter sensor such as the parameter sensor 5 of FIG. 1 may be described in terms of modes. As described in the aforementioned United States Patent Application entitled "Generalized Modal Space Drive Control System for a Vibrating Tube Process Parameter Sensor," a modal transformation, i.e., a modal filter, transforms physical responses to modal responses. The standard modal transformation is given by:

$$x=\Phi\eta, \quad (1)$$

where x is a vector of physical responses, $\Phi$ is an eigenvector matrix, and $\eta$ is a vector of modal responses. The physical response vector x can be thought of as the input, i.e. the feedback signals, to the modal filter $\Phi$. Solving Equation (1) for $\eta$, the modal responses:

$$\eta=\Phi^{\dagger}x, \quad (2)$$

where $\Phi^{\dagger}$ is a generalized inverse of $\Phi$. If the matrix $\Phi$ is square and non-singular, the inverse matrix $\Phi^{-1}$ may be used in Equation (2). The eigenvector matrix is square and non-singular when the modal vectors are linearly independent and the number of locations on the sensor conduit for which motion information is provided equals the number of modes considered.

Still referring to FIG. 1, the parameter sensor 5 also includes a modal parameter estimator 30 and a process parameter estimator 40. The modal parameter estimator 30 is responsive to first and second motion signals received from the first and second motion transducers 105, 105' on the transducer leads 111. The motion signals represent motion of the conduits 103A, 103B in a physical domain, e.g., signals representing displacement, velocity or acceleration as a material flows through the conduit assembly 10. The modal parameter estimator 30 processes the received motion signals to generate an estimate of a modal parameter, such as a modal filter parameter or a force projection parameter that relates behavior of the conduit in the spatial domain to behavior of at least one independent single degree of freedom (SDOF) system in a modal domain. The process parameter estimator 40 is also configured to receive the motion signals, and is responsive to the estimated modal parameter 35 to estimate a process parameter, e.g., mass flow rate, totalized mass flow, density or the like, associated with a material flowing through the conduit assembly 10.

Figure 2:
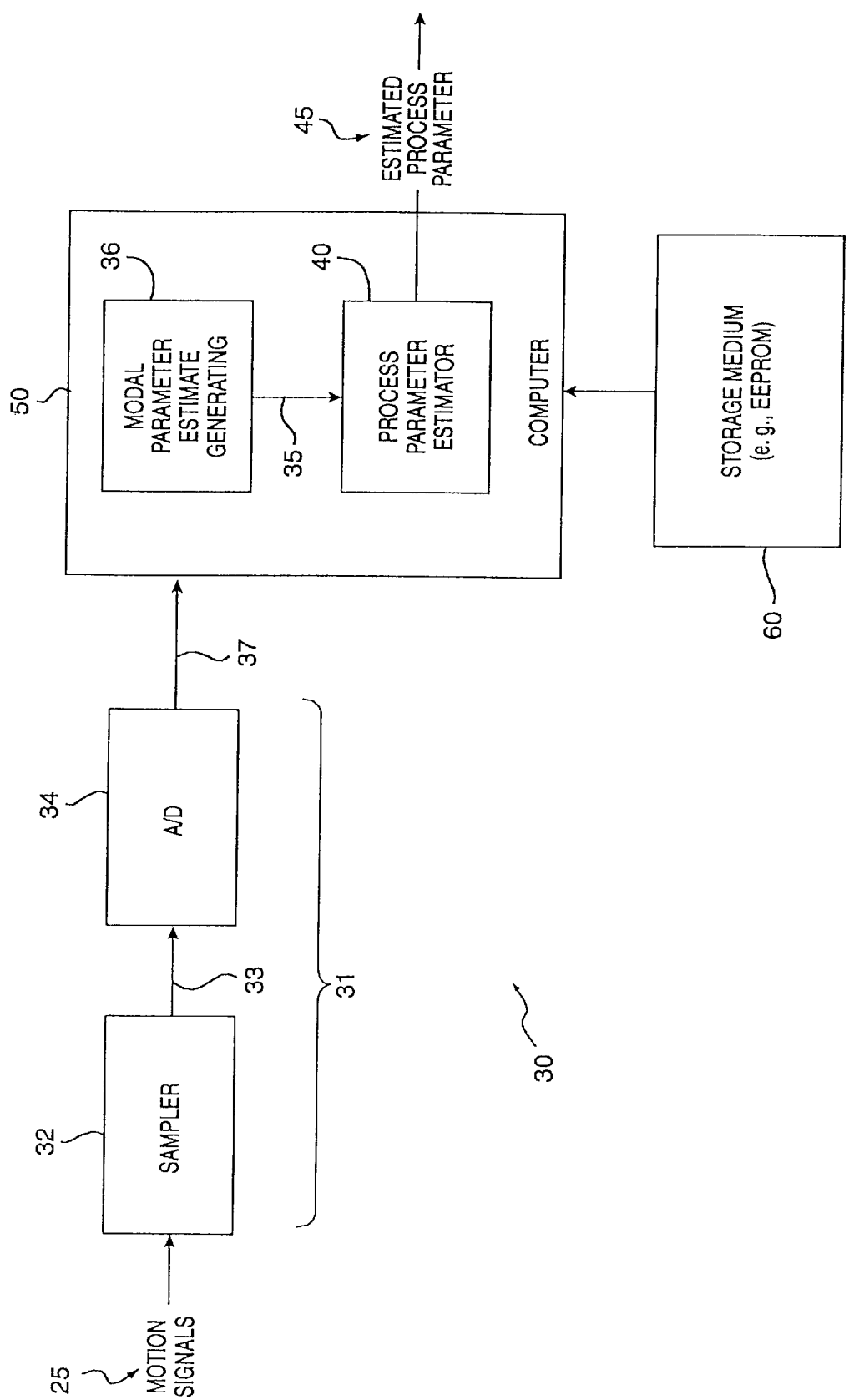
FIG. 2 illustrates an embodiment of a modal parameter estimator according to the present invention.

FIG. 2 illustrates an exemplary embodiment of the modal parameter estimator 30. As illustrated, the modal parameter estimator 30 includes a sampler 32, for example, a sample-and-hold or similar circuit, and an analog-to-digital converter (A/D) 34. The sampler 32 and the A/D 34 provide means 31 for receiving motion transducer motion signals 25 produced by the first and second motion transducers 105, 105', sampling the motion signals 25 and producing samples 33 therefrom which are converted to digital signal values 37 by the analog-to-digital converter (A/D) 34. Detailed operations of the illustrated sampler 32 and A/D 34 may be performed by a number of circuits known to those skilled in the art, and need not be discussed in greater detail herein. Those skilled in the art will appreciate that the receiving means 31 illustrated in FIG. 2 may be implemented in a number of ways, including additional pre-sampling anti-alias filtering, post-sampling filtering and the like. It will also be understood that, in general, the receiving means 31 illustrated in FIG. 2 may be implemented using special purpose hardware, firmware or software running on special or general-purpose data processing devices, or combinations thereof.

Portions of the modal parameter estimator 30 may be embodied in a computer 50, e.g., a microprocessor, microcontroller, digital signal processor (DSP) or the like. For example, the computer 50 may include a pipelined DSP suited for linear algebraic computations, such as a DSP of the TMS320C4X family of DSPs sold by Texas Instruments, Inc. Configured with appropriate program code, e.g., software and/or firmware and data stored, for example, in a storage medium 60 such as a random access memory (RAM), electrically erasable programmable read-only memory (EEPROM), magnetic disk or the like, the computer 50 provides means 36 for generating an estimate 35 of a modal filter parameter from the digital signal values 37. Portions of the process parameter estimator 40 may also be implemented by the computer 50 and associated program code. For example, program code capable of linear algebraic computations for implementing a modal filter, as well as code for generating digital signals for driving the actuator 104, may be executed in the computer 50.

Figure 3:
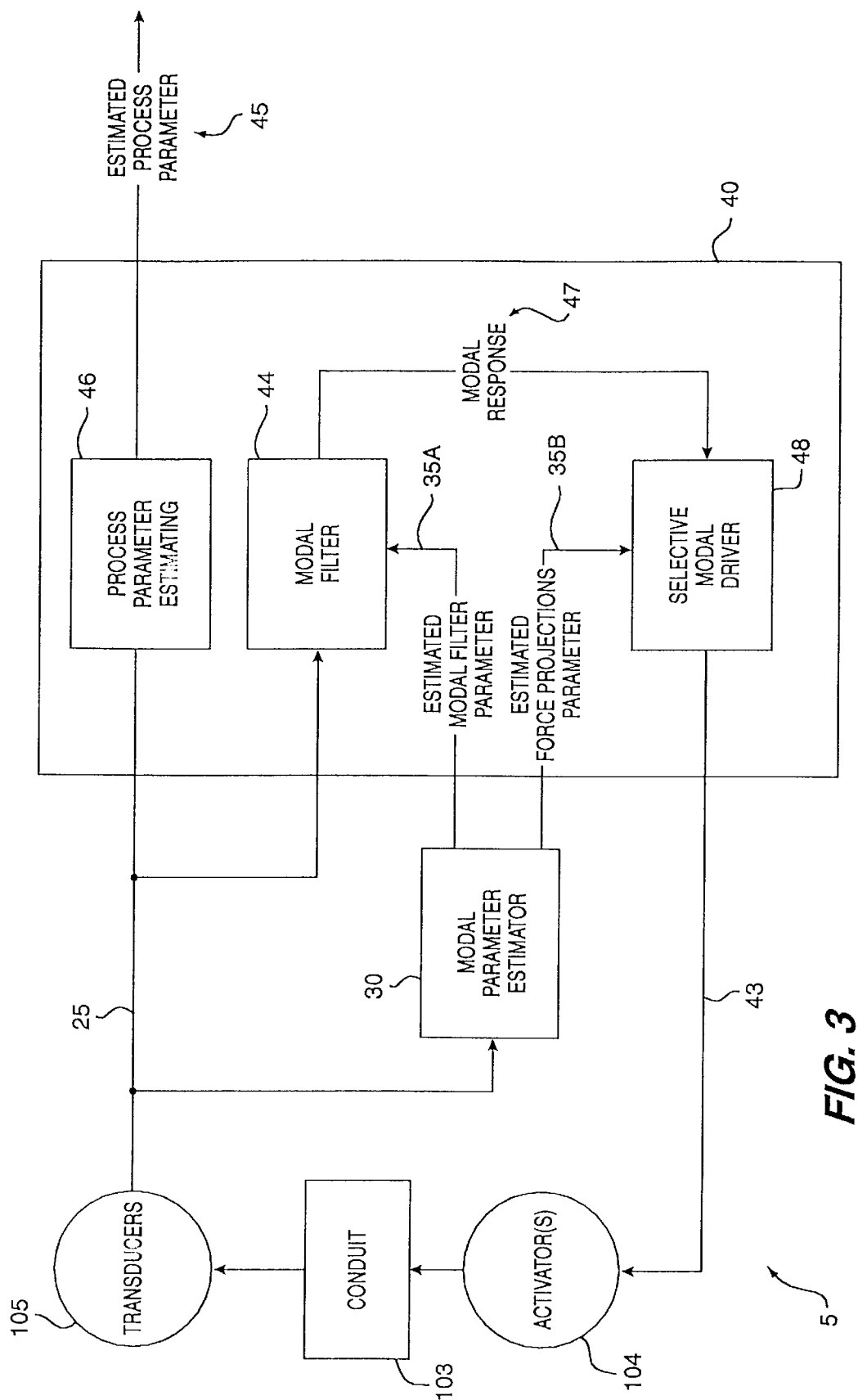
FIG. 3 illustrates operations for estimating a modal parameter according to an aspect of the present invention.

As described above, the process parameter estimator 40 of FIG. 1 is configured to receive motion signals from motion transducers and is operative to estimate a process parameter associated with a material flowing through conduits 103A, 103B according to an estimated modal parameter 35. FIG. 3 illustrates an embodiment according to the present invention in which the process parameter estimator 40 includes a modal filter 44 which is operative to filter motion signals 25 representing the physical response of a conduit 103, responsive to an estimate 35a of a modal filter parameter supplied by the modal parameter estimator 30. The modal filter 44 produces a modal response 47 representing a mapping of the physical response to a modal domain. A selective modal driver 48 is responsive to the modal filter 44 and the modal parameter estimator 30, producing one or more drive signals 43 according to the modal response 47 and a force projection parameter 35b supplied by the modal parameter estimator 30.

The one or more drive signals 43 may be designed to preferentially excite one or more vibrational modes of the conduit 103, to provide improved measurements such as described in the aforementioned United States Patent Application "Generalized Modal Space Drive Control System for a Vibrating Tube Process Parameter Sensor." Process parameter estimating means 46 generate an estimate 45 of a process parameter, e.g., mass flow, density and the like, from the motion signals 25 produced by the transducers 105 using, for example, a conventional Coriolis flow rate determining circuit as described in United States Patent RE 31,450 to Smith, U.S. Pat. No. 4,879,911 to Zolock, and U.S. Pat. No. 5,231,884 to Zolock. Alternatively, an estimate of a process parameter could be generated from the modal response 47, as described in a United States Patent Application entitled "Vibrating Conduit Parameter Sensors, Operating Methods and Computer Program Products Utilizing Real Normal Modal Decomposition", assigned to the assignee of the present application and filed concurrently herewith.

Figure 4:
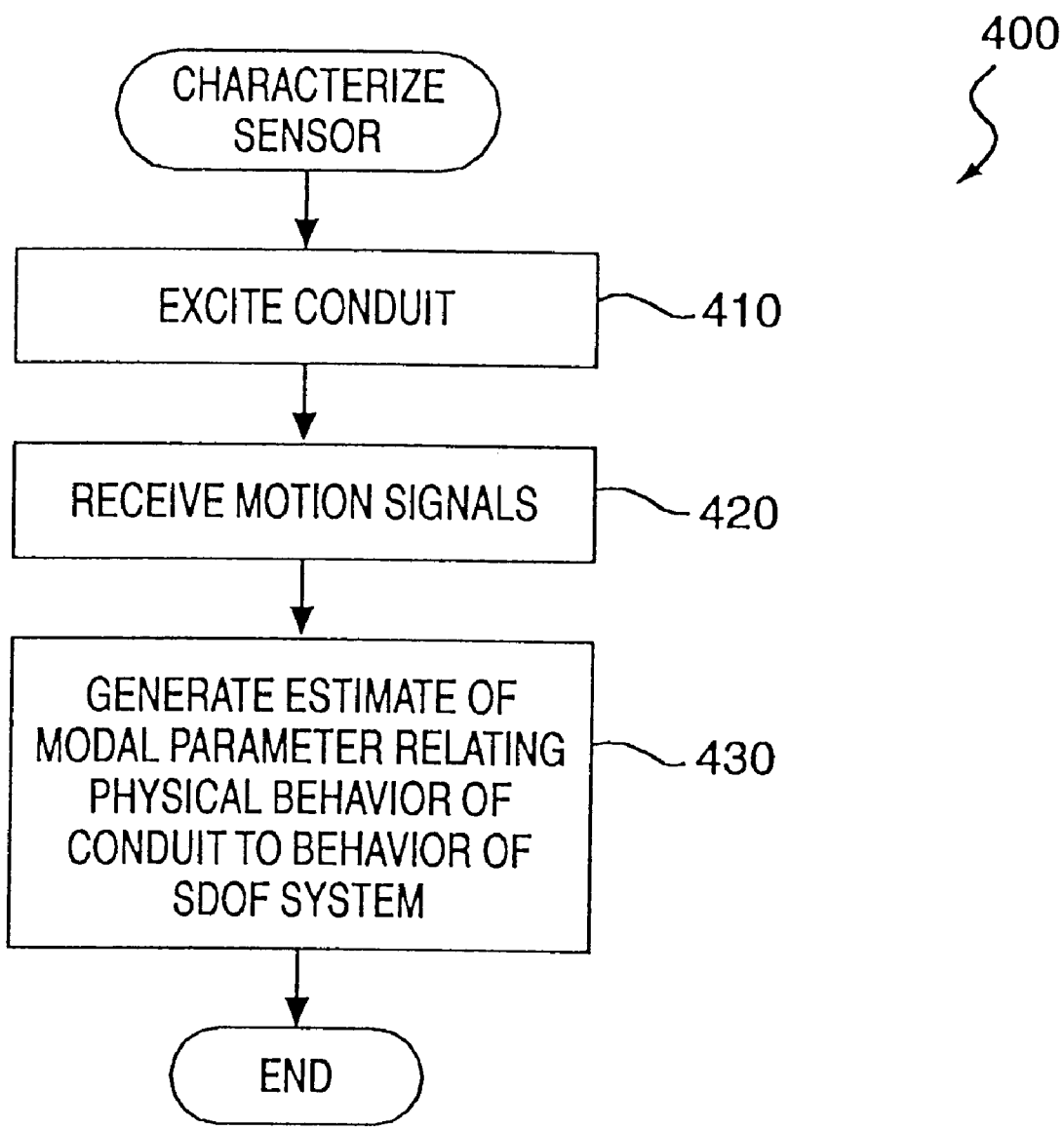
FIG. 4 illustrates an embodiment of a parameter sensor according to the present invention.

FIG. 4 illustrates operations 400 for characterizing a parameter sensor according to an aspect of the present invention. A conduit, such as the conduits 103A, 103B of FIG. 1, is excited (Block 410). For example, a periodic excitation may be applied to the conduit(s) by one or more actuators such as the actuator 104 of FIG. 1. Motion signals representing a physical response to the excitation are received (Block 420). An estimate of a modal parameter, e.g., a modal filter parameter or a force projection parameter, is generated from the received motion signals (Block 430). For example, a modal filter parameter may be estimated using one of the MRMV or AMF techniques described in detail below, and a force projector may be determined from the estimated modal filter parameters as described in the aforementioned United States Patent Application "Generalized Modal Space Drive Control System for a Vibrating Tube Process Parameter Sensor."

Modified Reciprocal Modal Vector Estimation

According to an aspect of the present invention, a modified reciprocal modal vector (MRMV) estimation technique uses a frequency response function (FRF) of a vibrating conduit parameter sensor to generate an estimate of a modal filter parameter. This technique may be employed in situ, for example, as part of an initialization process for the parameter sensor. The MRMV technique may also be used, for example, to intermittently update the estimate of the modal filter parameter during operation of the parameter sensor in a material processing system such as a chemical processing plant.

According to the MRMV technique, a sensor conduit is excited and corresponding frequency responses measured for a plurality of locations on the conduit over a range of frequencies. A variety of frequency response measurement techniques may be used, such as coherent sine sweep measurements or broadband measurements employing Fast Fourier Transform (FFT) techniques. The frequency response measurements are used to generate an FRF matrix including a plurality of frequency response values for the desired frequencies for the plurality of locations on the conduit. A pole is identified for each mode of interest of the conduit structure, and a single degree of freedom (SDOF) vector is determined for each identified pole. An inverse of the FRF matrix is multiplied by an SDOF vector associated with a mode of interest to generate a reciprocal modal vector for the mode of interest. The reciprocal modal vectors for multiple modes of interest may be combined to construct a modal filter which, when applied to motion signals representing motion of the conduit in the physical domain, yields an estimate of corresponding motion in a modal domain including the modes of interest. General information regarding MRMV techniques for structural analysis are described at pp. 70–87 of a dissertation entitled "Investigation of Discrete Modal Filters for Structural Dynamics Applications," by Stuart J. Shelley, submitted to the Division of Graduate Studies and Research of the University of Cincinnati, 1991.

For purposes of illustration, eigenvectors for a CMF300 model dual u-shaped conduit Coriolis mass flowmeter (manufactured by Micro Motion, Inc. of Boulder, Colo.) were estimated using finite element analysis. Finite element modeling techniques are well known to those skilled in the art and do not form part of the present invention. The exemplary finite element model was built using SDRC I-DEAS and analyzed by MSC/NASTRAN, a finite element code available from MacNeal-Schwendler. Those skilled in the finite element modeling art recognize that other finite element modeling tools and techniques could alternatively be used. See "A Finite Element for the Vibration Analysis of a Fluid-Conveying Timeshenko Beam." (AIAA Paper 93-1552), for more information on finite element modeling of Coriolis flowmeters.

The identified eigenvectors for the simulated CFM300 sensor were then reduced to three desired modes including a drive mode, a twist mode and a bend mode. Corresponding natural frequency $\omega$ and damping $\zeta$ values were then calculated for the three desired modes:

$$\omega_n = \begin{bmatrix} 73.47 \\ 184.53 \\ 466.49 \end{bmatrix}$$

and $$\zeta = \begin{bmatrix} 0.05 \\ 0.05 \\ 0.05 \end{bmatrix}.$$

Three transducer locations were used, including a transducer positioned near the center of the u-shaped conduit structure and left and right transducers placed symmetrically about the center transducer.

According to the MRMV technique, an FRF matrix for a structure preferably is evaluated at frequencies near resonant peaks of the structure, as signal to noise ratios at these frequencies typically are higher than at non-resonant frequencies. More preferably, frequency response values are determined at estimated resonant frequencies and at half power points for modes of interest, as well as at a maximum frequency of the range of frequencies of interest. For the simulated CFM300 sensor, the FRF H evaluated at the resulting ten frequencies (including a maximum frequency of 500 Hz) is:

$$H = \begin{bmatrix}
114.4 + 229i & 262.1 + 524.6i & 114.4 + 228.7i \\
572.3 + 0.2i & 1.3 \times 10^3 + 4.9 \times 10^{-3}i & 572.3 + 0.2i \\
114.6 - 228.8i & 262.6 - 524.9i & 114.6 - 229.2i \\
77.1 + 153.9i & 3 \times 10^{-4} + 0.6i & -77.1 + 154.5i \\
385.6 - 0.3i & 2.9 \times 10^{-4} - 0.6i & -385.6 - 0.3i \\
77.2 - 154.6i & 3 \times 10^{-4} - 0.6i & -77.2 + 154i \\
-6.9 - 14i & 6.1 + 11.9i & -6.9 - 13.6i \\
-34.3 - 0.3i & 30.3 - 0.2i & -34.3 + 0.1i \\
-6.9 + 13.5i & 6.1 - 12.3i & -6.9 + 13.8i \\
-1.7 \times 10^{-3} - 3.4 \times 10^{-3}i & 1.6 \times 10^{-3} - 0.4i & -1.8 \times 10^{-3} + 0.3i
\end{bmatrix}$$

As shown, the FRF matrix H has real and imaginary parts. These real and imaginary parts form independent sets of equations and, therefore, the FRF matrix H can be restructured as a 3 by 20 matrix including the real values stacked on the imaginary values.

In addition to determination of an FRF matrix, the MRMV technique includes identification of a pole, e.g., determination of frequency and damping for each mode of interest. In a self-characterizing sensor according to the present invention, a pole may be identified in a number of ways. A pole estimate may be generated for a type of sensor using, for example, a finite element model or an aggregate model generated by experimental analysis of a population of sensors. Alternatively, a pole estimate for a particular sensor may be generated by exciting the sensor at a particular frequency, measuring corresponding frequency response, and applying one of a variety of well-known curve fitting techniques to generate a pole estimate.

According to the MRMV technique, an identified pole $\lambda_k$ is used to generate an SDOF vector representing a kth mode of interest, evaluated at the frequencies used in the FRF matrix:

$$SDOF_k(\lambda_k, \omega) = \left( \frac{-i}{i \cdot \omega - \lambda_k} + \frac{i}{i \cdot \omega + \lambda_k} \right) \cdot i \cdot \omega,$$

where $$\lambda_k = -(\lambda_k \cdot \omega_{n_k}) + i \cdot \omega_{n_k} \cdot \sqrt{1 - \zeta_k^2}.$$

With knowledge of the FRF matrix H and the SDOF vector for a mode of interest, a reciprocal modal vector for the mode of interest may be determined. In particular, the FRF matrix, the SDOF vector and the reciprocal modal vector for a kth mode of interest are related by:

$$H \cdot \Psi_k = SDOF_k,$$

or $$\Psi_k = H^\dagger \cdot SDOF_k,$$

where $H^\dagger$ is a generalized inverse of the FRF matrix H.

For the simulated CFM300 sensor described above, the modified reciprocal modal vectors for the bend ($\Psi_b$) and twist ($\Psi_t$) modes (using the poles identified by finite element analysis) are:

$$\Psi_b = \begin{bmatrix} 0.4856 \\ 1.109 \\ 0.4856 \end{bmatrix},$$

and $$\Psi_t = \begin{bmatrix} 2.5933 \\ 0 \\ -2.5933 \end{bmatrix}.$$

As might be expected, the outputs of the symmetrically-placed right and left transducers of the simulated CFM300 sensor are given equal weight in each of the vectors, while the bend mode vector gives greater weight to the output of the center transducer than does the twist mode vector. The modified reciprocal modal vectors may be combined to form a modal filter matrix approximates the behavior of the eigenvector matrix Φ described above.

Figure 5:
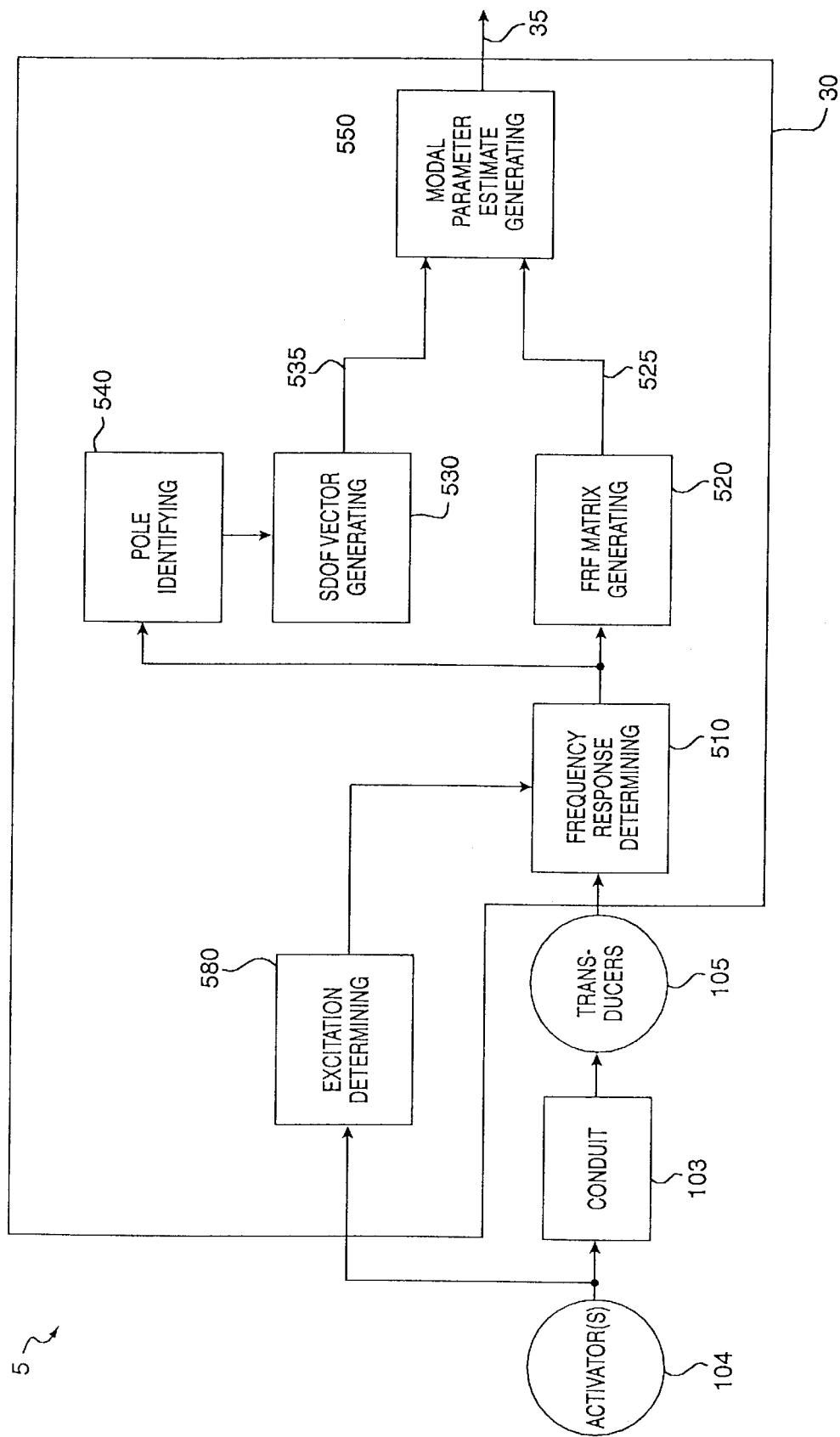
FIG. 5 illustrates an embodiment of a parameter sensor according to the present invention employing a modified reciprocal modal vector (MRMV) estimation technique.

FIG. 5 illustrates an embodiment of a self-characterizing parameter sensor 5 that is operative to utilize an MRMV technique to estimate a modal parameter of the sensor. A modal parameter estimator 30 includes frequency response determining means 510 for generating a plurality of frequency responses for a plurality of locations on a conduit 103 over a range of frequencies. Excitation determining means 560 determine an excitation applied to the conduit 103, providing the frequency response determining means 510 with a measure of the excitation applied to the conduit 103 such that frequency response measurements for a plurality of locations on the conduit assembly may be obtained. Those skilled in the art will appreciate, however, that the excitation level may be determined in other ways. For example, the excitation level may be assumed or may be derived from a drive command for the actuator 104, rendering the excitation determining means 560 as illustrated in FIG. 5 unnecessary.

Means 520 for generating an FRF matrix 525 are responsive to the frequency response determining means 510, producing an FRF matrix 525 that includes frequency response values at a plurality of frequencies (rows) at a plurality of locations (columns) on the conduit 103. SDOF vector generating means 530 generate an SDOF vector 535 representing natural frequency and damping information for a pole of the conduit 103 identified by pole identifying means 540. The pole identifying means 540 may be responsive to the frequency response determining means 510, for example, producing a pole estimate in situ using one of a variety of well-known pole identification techniques as described above. Alternatively, the pole identifying means 540 may identify a pole of the conduit 103 by using an off-line technique such as finite element modeling, as described above. Means 550 for generating an estimate of a modal filter parameter are responsive to the FRF matrix generating means 520 and the SDOF vector generating means 530, generating an estimate 35 of a modal filter parameter from the FRF matrix 525 and the SDOF vector 535.

Those skilled in the art will appreciate that the excitation determining means 560, the frequency response determining means 510, the pole identifying means 540, the SDOF vector generating means 530, the FRF matrix generating means 520, and the modal parameter estimate generating means 550 illustrated in FIG. 5 may be implemented, for example, in computer or other data processing device such as the computer 50 illustrated in FIG. 2. It will be understood that, in general, the means illustrated in FIG. 5 may be implemented using special purpose hardware, software or firmware running on special or general purpose computing hardware, or combinations thereof.

Figure 6:
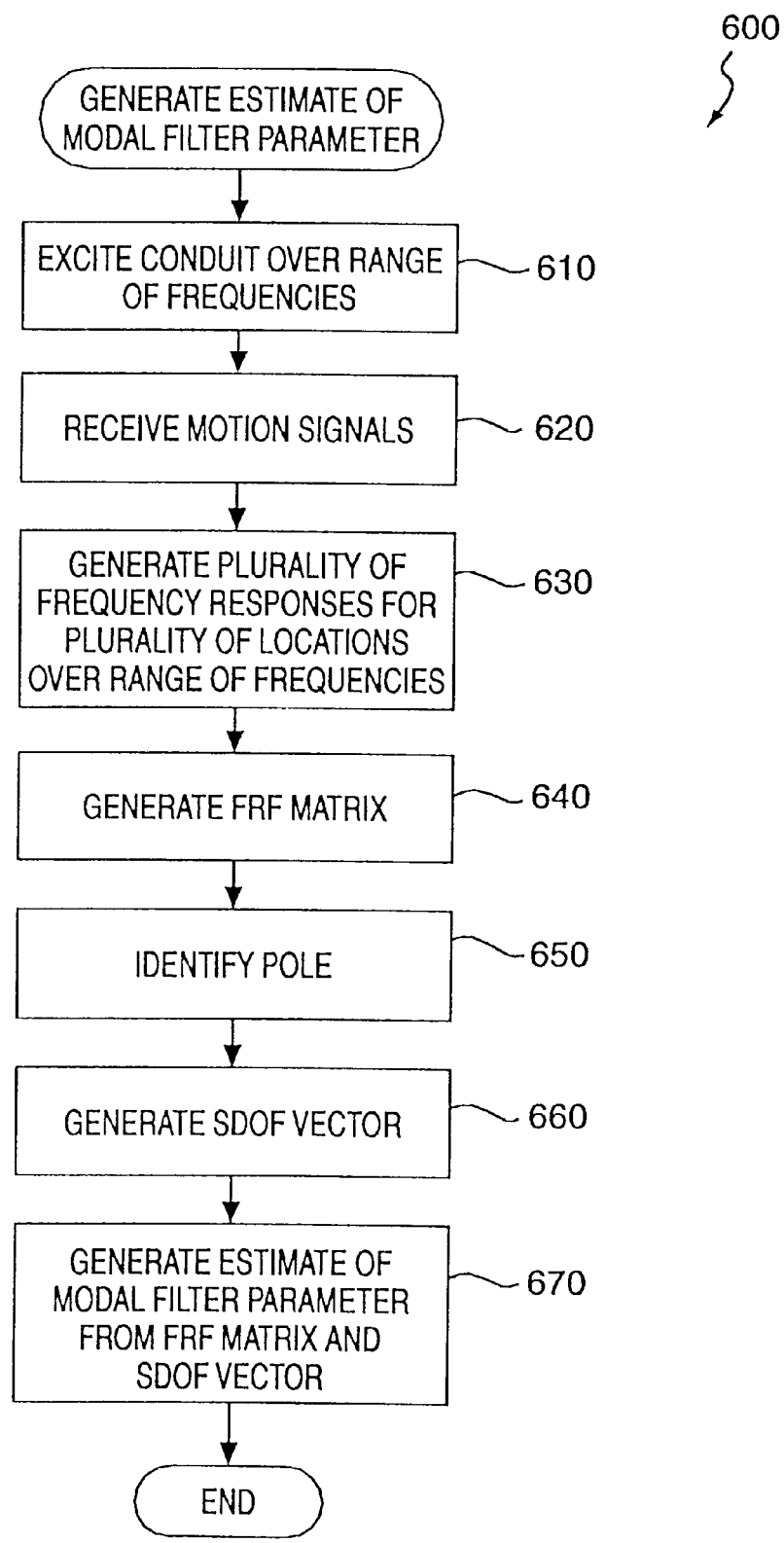
FIG. 6 illustrates operations for estimating a modal filter parameter according to an MRMV aspect of the present invention.

FIG. 6 illustrates operations 600 for estimating a modal filter parameter using an MRMV technique according to the present invention. A conduit is excited over a range of frequencies (Block 610). Motion signals representing a physical response to the excitation at a plurality of locations on the conduit are received (Block 620). A plurality of frequency responses is determined for the plurality of locations over the range of frequencies from the received plurality of motion signals (Block 630). An FRF matrix is then generated from the plurality of frequency responses (Block 640). A pole of the conduit is identified (Block 650), and an SDOF vector is generated therefrom (Block 660). An estimate of a modal filter parameter is generated from the FRF matrix and the SDOF vector (Block 670).

Those skilled in the art will appreciate that the frequency response measurements described above may be performed in a number of ways. For example, a sine sweep may be performed in which the conduit is excited sequentially with a series of substantially coherent periodic excitations, with frequency response measurements being performed at each excitation frequency. Alternatively, the conduit may be excited with a broadband excitation having a plurality of periodic components having frequencies in a range of frequencies, with frequency response measurements being performed over the range of frequencies using techniques such as Fast Fourier Transform (FFT) techniques. Those skilled in the art will also appreciate that the pole identification process (Block 650) may occur offline, preceding the frequency response measurement process (Block 630), or may be performed responsive to the frequency response measurement process as described above.

Adaptive Modal Filtering

According to an adaptive modal filter aspect of the present invention, successive estimates of a modal filter parameter are iteratively generated as a parameter sensor is operated in situ. An initial estimate $\hat{\Psi}_k$ of a modal filter vector (i.e., an initial estimate of modal filter coefficients) is formed. The initial estimate may be a vector of zeros or other values that preferably are not so far from the desired result as to lead to convergence problems. This initial modal filter vector is applied to actual motion values $x_k$ derived from motion signals received from transducers on a conduit assembly, producing an initial estimate $\hat{\eta}_k$ of a modal response for the sensor. An error may be defined as a difference between the estimated modal response $\hat{\eta}_k$ and a "true" modal response $\hat{\eta}_k$ for a time k:

$$e_k = \eta_k - \hat{\eta}_k. \quad (3)$$

The error $e_k$ could be used to modify the the modal filter to make the estimated modal response $\hat{\eta}_k$ conform to the true modal response $\eta_k$. However, the true modal response $\eta_k$ is generally not known, so a reference modal system having a reference modal response $\eta^r_k$ that is highly correlated with the true modal behavior of a vibrating conduit type sensor is used according to the present invention to provide information for adjusting a modal filter parameter. The reference modal system may be generated from an SDOF model constructed from a pole for a mode of interest of the system. A continuous time SDOF system model for a reference modal system is given by:

$$\begin{Bmatrix} \dot{\eta}^r \\ \ddot{\eta}^r \end{Bmatrix} = \begin{bmatrix} 0 & 1 \\ -\omega_{n_i}^2 & 2\sigma_i \end{bmatrix} \cdot \begin{Bmatrix} \eta^r \\ \dot{\eta}^r \end{Bmatrix} + \begin{bmatrix} 0 \\ 2\omega_{d_i} \end{bmatrix}, \quad (4)$$

where $\eta^r$ is the reference modal response.

Equation (4) can be converted to a discrete form suitable for implementation in a digital computer:

$$\begin{Bmatrix} \eta^r \\ \dot{\eta}^r \end{Bmatrix}_{k+1} = A \begin{Bmatrix} \eta^r \\ \dot{\eta}^r \end{Bmatrix}_k + Bf_k, \quad (5)$$

where $f$ is an excitation applied to the conduit, e.g., a force or some measure of force, such as actuator current. Equation (5) can be applied over a series of time steps to minimize the error $e_k$ by successively generating modified estimates $\hat{\Psi}_k$ of the modal filter vector. A solution may be obtained using a least mean squared (LMS) technique. Various LMS techniques may be used, such as normalized LMS techniques or other adaptive techniques such as lattice filters, Kalman filters or adaptive least squares methods.

According to an exemplary technique, a squared error $e^2_k$ is minimized. For a kth time sample, and estimate $\hat{\nabla}_k$ of a gradient of the error $e^2_k$ is calculated, and the estimated modal filter vector $\hat{\Psi}_k$ is adjusted such that a step down the gradient $\hat{\nabla}_k$ is taken to reduce the error $e^2_k$. The estimate $\hat{\nabla}_k$ of the gradient is given by:

$$\hat{\nabla}_k = \frac{\partial e^2_k}{\partial \hat{\Psi}_k} = 2e_k \frac{\partial e_k}{\partial \hat{\Psi}_k} = 2e_k(-x_k). \quad (6)$$

At each iteration, $\hat{\Psi}_k$ is adjusted by subtracting a small multiple of the gradient:

$$\Psi_{k+1} = \Psi_k + 2\mu e_k x_k, \quad (7)$$

where $\mu$ is an adaptive gain which generally determines the speed and stability of convergence.

For a multi-input case, the response of a mode can be viewed as a arising from multiple input forces. The effect of each of these input forces may be described by an unknown vector of generally complex force appropriation coefficients $\{l\}$. A reference model for such a case is given by:

$$\left\{ \begin{array}{c} \eta^r \\ \dot{\eta}^r \end{array} \right\}_{k+1} = A \left\{ \begin{array}{c} \eta^r \\ \dot{\eta}^r \end{array} \right\} + B\{l\}^T\{f_k\}, \quad (8)$$

where $\{f_k\}$ is a vector of applied forces. The reference system is driven with a modal force including a sum of the input forces $\{f_k\}$ weighted by the force appropriation coefficients $\{l\}$. A corresponding reference modal coordinate may be generated by driving $N_i$ reference models:

$$\left\{ \begin{array}{c} \eta^{rI} \\ \dot{\eta}^{rI} \end{array} \right\}_{k+1} = A \left\{ \begin{array}{c} \eta^{rI} \\ \dot{\eta}^{rI} \end{array} \right\} + Bf_k^{rI} \quad (9)$$

$$\vdots$$

$$\left\{ \begin{array}{c} \eta^{rN_i} \\ \dot{\eta}^{rN_i} \end{array} \right\}_{k+1} = A \left\{ \begin{array}{c} \eta^{rN_i} \\ \dot{\eta}^{rN_i} \end{array} \right\} + Bf_k^{rN_i}$$

by $N_i$ unweighted forces and using the force appropriation vector $\{l\}$ to form a weighted average of the $N_I$ reference modal coordinates:

$$\eta_k^r = \{l\}^T \left\{ \begin{array}{c} \eta_k^{rI} \\ \vdots \\ \eta_k^{rN_i} \end{array} \right\} \quad (10)$$

$$= \{l\}^T \{\eta_k^{(r)}\}.$$

The "total" scalar modal coordinate response $\eta^r_k$ is derived from the inner product of the modal participation vector $\{l\}$ and the vector of partial scalar modal coordinates $\{\eta^{(r)}_k\}$ associated with the individual input forces.

A multi-input modal filter error is then given by:

$$e_k = \eta_k^r - \hat{\eta}_k \quad (11)$$

$$= \{l\}^T \{\eta_k^{(r)}\} - \{\psi\}^T \{x_k\}$$

$$= \left\{ \begin{array}{c} \psi \\ l \end{array} \right\}^T \left\{ \begin{array}{c} -x_k \\ \eta_k^{(r)} \end{array} \right\}$$

In this form, the problem solution yields both the modal filter vector $\{\Psi\}$ and the force appropriation or modal participation vector $\{l\}$. A trivial solution to be avoided is the zero error solution in which both the modal filter vector $\{\omega\}$ and and force appropriation vector $\{l\}$ are zero. This may be accomplished by normalizing one of the coefficients to a predetermined number, such as unity. For example, if $l_1$ is normalized to unity, Equation (11) becomes:

$$e_k = \left\{ \begin{array}{c} \psi \\ 1 \\ l_2 \\ \vdots \\ l_{N_i} \end{array} \right\}^T \left\{ \begin{array}{c} -x_k \\ \eta_k^{rI} \\ \eta_k^{r2} \\ \vdots \\ \eta_k^{rN_i} \end{array} \right\} \quad (12)$$

$$= \eta_k^{rI} + \left\{ \begin{array}{c} \psi \\ l_2 \\ \vdots \\ l_{N_i} \end{array} \right\}^T \left\{ \begin{array}{c} -x_k \\ \eta_k^{r2} \\ \vdots \\ \eta_k^{rN_i} \end{array} \right\}$$

This approach has a potential drawback that if the $l_I$ coefficient is close to zero, the problem may be ill-conditioned and inaccurate results can be achieved. An alternate solution involves imposing a norm constraint on the solution vector where, for instance, the norm of the solution vector is constrained to unity. This approach avoids the ill-conditioning problem, but can be more sensitive to noise in the measured data.

Figure 7:
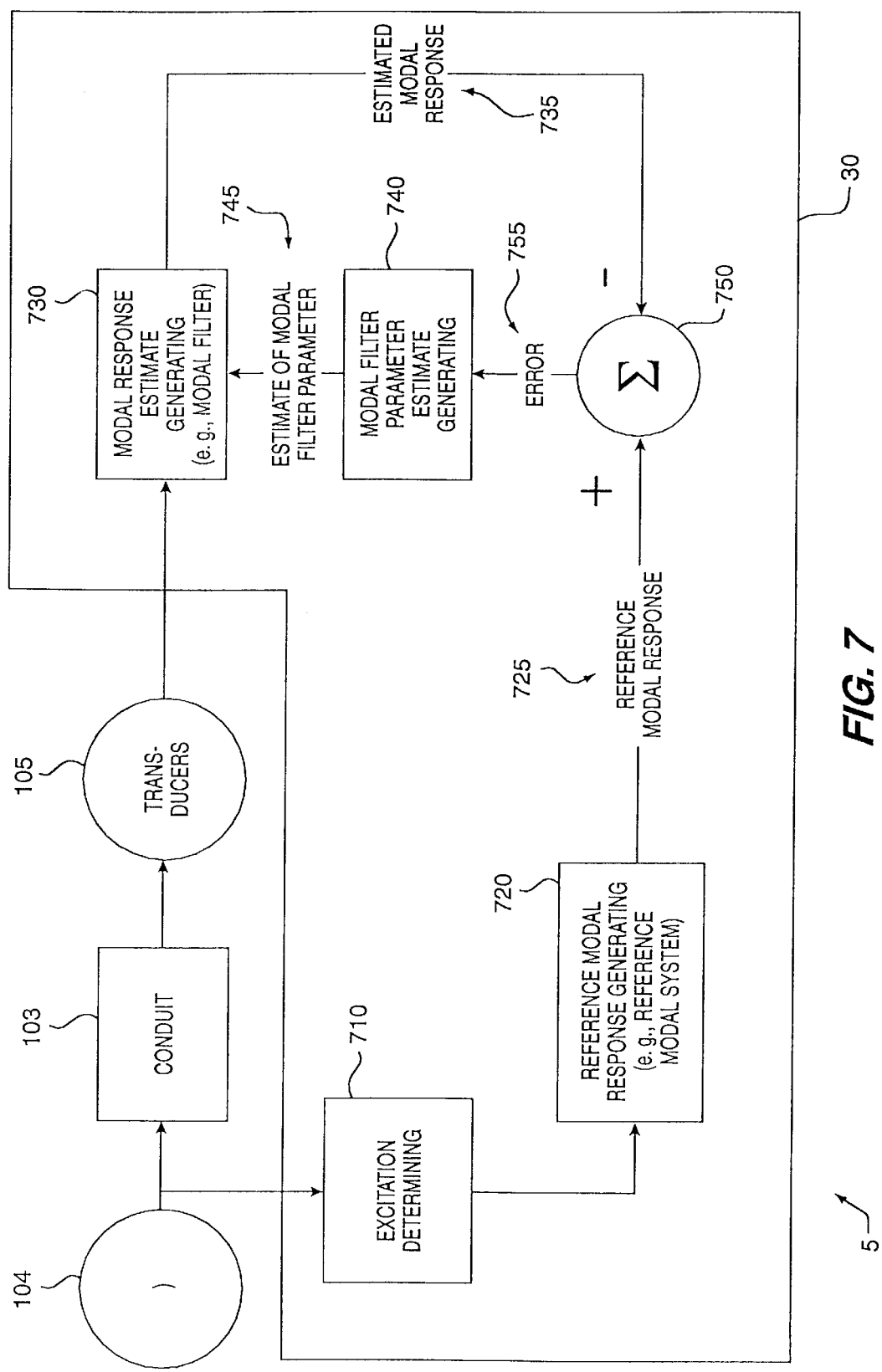
FIG. 7 illustrates an embodiment according to the present invention employing an adaptive modal filtering technique.

FIG. 7 illustrates an embodiment of a parameter sensor 5 that utilizes an adaptive modal filtering technique according to the present invention. An excitation is applied to a conduit 103 by one or more actuators 104, and transducers 105 produce motion signals in response thereto. A modal parameter estimator 30 includes excitation determining means 710 for determining the excitation applied to the conduit 103. The determined excitation is applied to means 720 for generating a reference modal response 725, i.e., the response of a reference modal system. Means 730 for generating an estimate of the sensor modal response, e.g., an estimated modal filter, are responsive to the tranducer 104, producing an estimated modal response 735 according to an estimate 745 of a modal filter parameter supplied thereto. Means 750 are provided for determining an error 755 of the estimated modal response 735 with respect to the reference modal response 725. Means 740 are provided for generating an estimate 745 of the modal filter parameter according to the error 755.

Those skilled in the art will appreciate that the excitation determining means 710, the reference modal response generating means 720, the modal response estimate generating means 730, the error determining means 750, and the modal filter parameter estimate generating means 740 illustrated in FIG. 7 may be implemented, for example, in computer or other data processing device such as the computer 50 illustrated in FIG. 2. It will be understood that, in general, the means illustrated in FIG. 7 may be implemented using special purpose hardware, software or firmware running on special or general purpose computing hardware, or combinations thereof.

Figure 8:
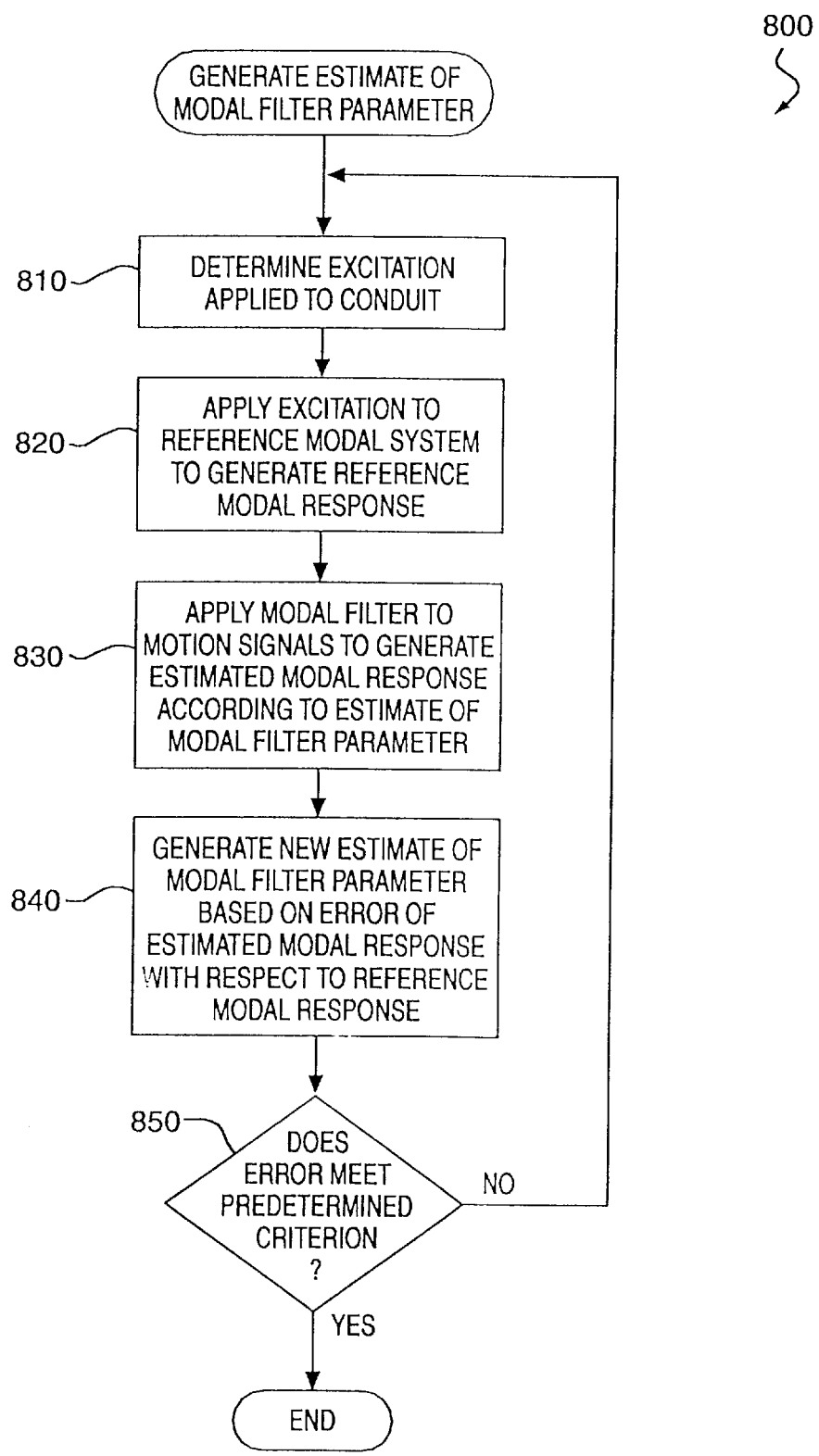
FIGS. 8 and 9 illustrate operations for estimating a modal filter parameter according to adaptive modal filtering aspects of the present invention.

FIG. 8 illustrates operations 800 using adaptive modal filtering to generate an estimate of a modal filter parameter. An excitation applied to a sensor conduit is determined (Block 810), and the determined excitation is applied to a reference modal system to generate a reference modal response (Block 820). A modal filter is applied to motion signals representing a response of the sensor conduit to the applied excitation to generate an estimated modal response according to an estimate of the modal filter parameter (Block 830). A new estimate of the modal filter parameter is generated based on an error of the estimated modal response with respect to the reference modal response (Block 840). If the error fails to meet a predetermined criterion (Block 850), e.g., if the error or some form thereof is greater than a predetermined threshold value, the operations of Blocks 810–840 are repeated until the criterion is met.

Figure 9:
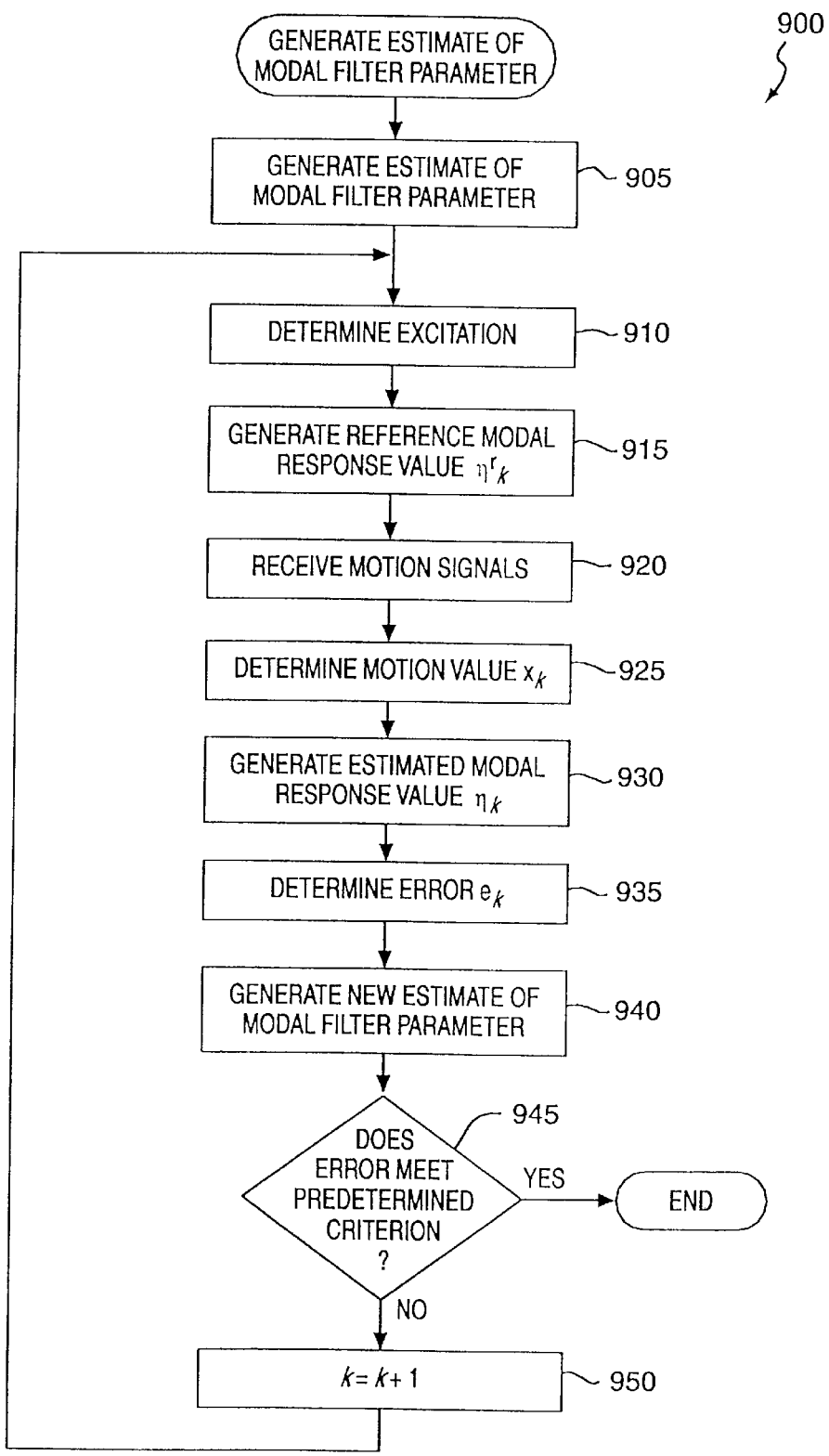

FIG. 9 illustrates another aspect of the present invention, in particular, operations 900 for generating an estimate of a modal filter parameter in which discrete computational cycles are performed along the lines of Equation (5) above. An initial estimate of the modal filter parameter is generated (Block 905). Excitation applied to the sensor conduit for a time k is determined (Block 910), and a reference modal response value $\eta_k^r$ is generated therefrom (Block 915). Motion signals representing motion of the sensor conduit in the physical domain are received (Block 920), a motion value $x_k$ is determined (Block 925), and an estimated modal response value $\eta_k$ is generated therefrom (Block 930). An error of the estimated modal response with respect to the reference modal responses is then determined (Block 935), and a new estimate of the modal parameter is generated based on the error (Block 940) using, for example, using Equation (7) above. If the error fails to meet a predetermined criterion, e.g., has a magnitude greater than a predetermined threshold value, the estimation process is repeated (Blocks 945–950 and Blocks 910–940) until the predetermined criterion is met.

It will be understood that blocks or combinations of blocks in the flowchart illustrations of FIGS. 4, 6 and 8–9 can be implemented using computer readable program code, e.g., program instructions and/or data operated on in a computer or data processor such as the computer 50 illustrated in FIG. 2. As used herein, computer readable program code may include but is not limited to such things as operating system commands (e.g., object code), high level language instructions, and the like, as well as data which may be read, accessed or otherwise utilized in conjunction with such program instructions.

The program code may be loaded onto a computer or similar data processing apparatus including, but not limited to, a microprocessor, a microcontroller, a digital signal processor (DSP) or the like. The combination of the program code and computer may provide an apparatus that is operative to implement a function or functions specified in a block or blocks of the flowchart illustrations. Similarly, the program code may be loaded onto a computer or data processing device such that the program code and computer provide means for performing the function or functions specified in a flowchart block or blocks.

The program code may also be stored in a computer-readable storage medium such as a magnetic disk or tape, a bubble memory, a programmable memory device such as an electrically-erasable programmable read-only memory (EEPROM), or the like. The stored program code may direct a computer accessing the storage medium to function such that the program code stored in the storage medium forms an article of manufacture including program code means for implementing the function or functions specified in a flowchart block or blocks. The program code may also be loaded onto a computer to cause a series of operational steps to be performed, thereby implementing a process such that the program code, in conjunction with the computer, provides steps for implementing the functions specified in a flowchart block or blocks. Accordingly, blocks of the flowchart illustrations support apparatus operative to perform the specified functions, combinations of means for performing the specified functions, combinations of steps that perform the specified functions and computer readable program code means embodied in a computer-readable storage medium for performing the specified functions.

It will also be understood that, in general, each block of the flowchart illustrations, and combinations of blocks in the flowchart illustrations, can be implemented by special purpose hardware, software or firmware executing on a general purpose computer, or combinations thereof. For example, functions of the blocks of the flowchart illustrations may be implemented by an application specific integrated circuit (ASIC), programmable gate array or similar special purpose device, or by program instructions and data loaded on and executed by a microprocessor, microcontroller, DSP or other general-purpose computing device.

As described herein, a vibrating conduit parameter sensor, e.g., a Coriolis flowmeter, vibrating tube densitometer or the like, includes a modal parameter estimator that is operative to estimate a modal parameter of the sensor responsive to motion signals produced by the sensor's transducers. A modal parameter may be estimated by a number of techniques. For example, a modal filter parameter may be estimated by a modified reciprocal modal vector (MRMV) estimation technique or an adaptive modal filtering technique. An estimated modal filter parameter may be used to generate a force projection parameter for selectively exciting one or more modes of a sensor conduit. These techniques may be modified in additional ways within the scope of the present invention. For example, improved measurements may be achieved by using estimated modal filter and force projection parameters to preferentially excite a mode of the sensor conduit such that more accurate estimates for that mode, e.g., pole estimates, frequency response estimates and the like, may be obtained and in turn used to generate even more accurate modal parameter estimates.

The drawings and specification of the present application disclose embodiments of the invention. Although specific terms are employed, they are used in a generic and descriptive sense only and not for purposes of limitation. It is expected that persons skilled in the art can and will make, That which is claimed is:

1. A self-characterizing sensor for measuring a process parameter in a material processing system, the sensor comprising:

a conduit configured to contain material from the material processing system;

a plurality of motion transducers operative to produce a plurality of motion signals representing motion at a plurality of locations on said conduit;

a modal parameter estimator configured to receive the plurality of motion signals and operative to generate an estimated modal parameter from the received plurality of motion signals, wherein the estimated modal parameter relates a behavior of said conduit to a behavior of a single degree of freedom (SDOF) system; and a process parameter estimator configured to receive the plurality of motion signals, responsive to said modal parameter estimator and operative to estimate a process parameter for the material processing system from the received plurality of motion signals according to the estimated modal parameter.

2. A sensor according to claim 1, wherein said modal parameter estimator comprises means for generating an estimate of a modal filter parameter.

3. A sensor according to claim 2, wherein said means for generating an estimate of a modal filter parameter comprises:

means, responsive to the plurality of motion transducers, for determining a plurality of frequency responses for the plurality of locations over a range of frequencies from the plurality of motion signals; and means, responsive to said means for determining a plurality of frequency responses, for generating an estimate of a modal filter parameter from the determined plurality of frequency responses.

4. A sensor according to claim 3, further comprising:

an actuator operative to excite said conduit in response to a drive signal applied thereto; and a driver operative to apply a drive signal to said actuator.

5. A sensor according to claim 4:

wherein said driver and said actuator are operative to excite said conduit with a coherent periodic excitation having an excitation frequency; and wherein said means for determining a plurality of frequency responses comprises means for determining a plurality of frequency response values at said excitation frequency for said plurality of locations.

6. A sensor according to claim 4:

wherein said driver and actuator are operative to excite said conduit with an excitation comprising a plurality of periodic components, wherein a respective one of the plurality of periodic components has a respective frequency associated therewith and wherein said frequencies of said periodic components are distributed over said range of frequencies; and wherein said means for determining a plurality of frequency responses comprises means for determining a plurality of frequency response values over the range of frequencies.

7. A sensor according to claim 3, wherein said means for generating an estimate of a modal filter parameter comprises:

means, responsive to said means for generating a plurality of frequency responses, for generating a frequency response function (FRF) matrix from the plurality of frequency responses;

means, responsive to said means for generating an FRF matrix, for identifying a pole corresponding to a mode of the sensor;

means, responsive to said means for identifying a pole, for generating an SDOF vector from the identified pole; and means, responsive to said means for generating an FRF matrix and to said means for generating an SDOF vector, for generating an estimate of a modal filter parameter from the estimated FRF matrix and the estimated SDOF vector.

8. A sensor according to claim 2, wherein said means for generating an estimate of a modal filter parameter comprises:

means for determining an excitation applied to said conduit;

means, responsive to said excitation determining means, for generating a reference modal response to the determined excitation;

means, responsive to said plurality of motion transducers, for generating an estimated modal response from the plurality of motion signals according to an estimate of the modal filter parameter; and means, responsive to said means for generating a reference modal response and to said means for generating an estimated modal response, for generating a new estimate of the modal filter parameter based on an error of the estimated modal response with respect to the reference modal response.

9. A sensor according to claim 1, wherein said modal parameter estimator comprises means for generating an estimate of a force projection parameter relating a force in an SDOF system to an excitation of said conduit, and further comprising:

an actuator operative to excite said conduit in response to a drive signal applied thereto; and a driver responsive to said means for generating an estimate of a force projection parameter and operative to apply a drive signal to said actuator responsive to a modal force command according to the generated estimate of the force projection parameter.

10. A sensor according to claim 1, wherein said process parameter estimator comprises means for estimating mass flow.

11. An apparatus for characterizing a vibrating conduit parameter sensor including a conduit and a plurality of motion transducers operative to produce motion signals representing motion of the conduit, the apparatus comprising:

means, responsive to the plurality of motion transducers, for receiving a plurality of motion signals;

means, responsive to said means for receiving, for generating an estimated modal parameter using a modal parameter estimator from the received plurality of motion signals, wherein the estimated modal parameter relates a behavior of the conduit to a behavior of a single degree of freedom (SDOF) system; and means responsive to said means for generating, for providing an estimated process parameter using a process parameter estimator for a material flowing through the conduit from the received plurality of motion signals according to the estimated modal parameter.

12. An apparatus according to claim 11, wherein said means for estimating a modal parameter comprises means for generating an estimate of a modal filter parameter.

13. An apparatus according to claim 12, wherein said means for generating an estimate of a modal filter parameter comprises:

means, responsive to said means for receiving, for determining a plurality of frequency responses for the plurality of locations over a range of frequencies from the received plurality of motion signals; and means, responsive to said means for determining a plurality of frequency responses, for generating an estimate of a modal filter parameter from the determined plurality of frequency responses.

14. An apparatus according to claim 13, wherein said means for generating an estimate of a modal filter parameter comprises:

means, responsive to said means for generating a plurality of frequency responses, for generating a frequency response function (FRF) matrix from the plurality of frequency responses;

means, responsive to said means for generating an FRF matrix, for identifying a pole corresponding to a mode of the sensor;

means, responsive to said means for identifying a pole, for generating an SDOF vector from the identified pole; and means, responsive to said means for generating an FRF matrix and to said means for generating an SDOF vector, for generating an estimate of a modal filter parameter from the estimated FRF matrix and the estimated SDOF vector.

15. An apparatus according to claim 12, wherein said means for generating an estimate of a modal filter parameter comprises:

means for determining an excitation applied to said conduit;

reference modal system means, responsive to said means for determining an excitation, for generating a reference modal response to the determined excitation;

means, responsive to the plurality of motion transducers, for generating an estimated modal response from the plurality of motion signals according to an estimate of the modal filter parameter; and means, responsive to said means for generating a reference modal response and to said means for generating an estimated modal response, for generating a new estimate of the modal filter parameter based on a error of the estimated modal response with respect to the reference modal response.

16. An apparatus according to claim 11, wherein said means for estimating a modal parameter comprises means for generating an estimate of a force projection parameter relating a force in an SDOF system to an excitation of the conduit.

17. An in situ method of characterizing a sensor including a conduit configured to contain material from a material processing system and a plurality of motion transducers operatively associated with the conduit, the method comprising the steps of:

exciting the conduit;

receiving a plurality of motion signals from the plurality of motion transducers, the plurality of motion signals representing motion at a plurality of locations on the conduit in response to the excitation; and generating an estimated modal parameter with a modal parameter estimator for the sensor from the plurality of received motion signals, wherein the estimated modal parameter relates a behavior of the conduit to a behavior of a single degree of freedom (SDOF) system; and providing a process parameter estimate with a process parameter estimator, responsive to the modal parameter estimator for the material processing system from the received plurality of motion signals according to the estimated modal parameter.

18. A method according to claim 17, wherein said step of generating an estimate of a modal parameter comprises the step of generating an estimate of a modal filter parameter relating motion of the conduit to motion of an SDOF system.

19. A method according to claim 18:

wherein said step of exciting comprises the step of exciting the conduit over a range of frequencies; and wherein said step of generating an estimate of a modal filter parameter comprises the steps of:

determining a plurality of frequency responses for the plurality of locations over the range of frequencies from the received plurality of motion signals; and generating an estimate of a modal filter parameter for the sensor from the determined plurality of frequency responses.

20. A method according to claim 19:

wherein said step of exciting comprises the step of exciting the conduit with a coherent periodic excitation having a first excitation frequency;

wherein said step of receiving comprises the step of receiving a first plurality of motion signals representing motion of the conduit while the conduit is excited at the first excitation frequency;

wherein said step of determining a plurality of frequency responses comprises the step of determining a first plurality of frequency response values at the first excitation frequency for the plurality of locations from the first plurality of motion signals;

wherein said step of exciting further comprises the step of exciting the conduit with a coherent periodic excitation having second excitation frequency;

wherein said step of receiving further comprises the step of receiving a second plurality of motion signals representing motion of the conduit while the conduit is excited at the second excitation frequency; and wherein said step of determining a plurality of frequency responses further comprises the step of determining a second plurality of frequency response values at the second excitation frequency for the plurality of locations from the second plurality of motion signals.

21. A method according to claim 19:

wherein said step of exciting comprises the step of applying an excitation comprising a plurality of periodic components, wherein a respective one of the periodic components has a respective frequency associated therewith, and wherein the frequencies of the periodic components are distributed over the range of frequencies;

wherein said step of receiving comprises the step of receiving a plurality of motion signals representing motion of the conduit while the conduit is excited with the excitation comprising a plurality of periodic components; and wherein said step of determining a plurality of frequency responses comprises the step of determining a plurality of frequency response values for the plurality of locations over the range of frequencies.

22. A method according to claim 19, wherein said step of generating an estimate of a modal filter parameter comprises the steps of:

generating a frequency response function (FRF) matrix from the plurality of frequency responses;

identifying a pole corresponding to a mode of the sensor;

generating an SDOF vector from the identified pole; and generating an estimate of a modal filter parameter from the estimated FRF matrix and the estimated SDOF vector.

23. A method according to claim 18, wherein said step of generating an estimate of a modal filter parameter comprises the steps of:

determining an excitation applied to the conduit;

applying the determined excitation to a reference modal system to generate a reference modal response;

applying a modal filter to the plurality of motion signals to generate an estimated modal response according to an estimate of the modal filter parameter; and generating a new estimate of the modal filter parameter based on a difference between the estimated modal response and the reference modal response.

24. A method according to claim 23, wherein said determining, said applying and said generating steps are repeatedly performed until an error of the estimated modal response with respect to the reference modal response meets a predetermined criterion.

25. A method according to claim 17, comprising the steps of:

generating a reference modal response value;

generating an estimate of the modal filter parameter;

determining a motion value for a time instant;

generating an estimated modal response value from the estimate of the modal filter parameter and the motion value;

determining an error of the estimated modal response value with respect to the reference modal response value; and generating a new estimate of the modal filter parameter from the previous estimate of the modal filter parameter, the motion value and the determined error.

26. A method according to claim 25, wherein said steps of generating a modal response value, determining a motion value, generating an estimated modal response value, determining an error, and generating a new estimate of the modal filter parameter are repeatedly performed until an error of an estimated modal response value with respect to a reference modal response value meets a predetermined criterion.

27. A method according to claim 17, further comprising the step of determining the excitation applied to conduit, and wherein said step of estimating a modal parameter comprises the step of estimating a modal parameter from the determined excitation and the plurality of motion signals.

28. A method according to claim 17, wherein the sensor includes an actuator operatively associated with the conduit, and wherein said step of exciting comprises the step of exciting the conduit with the actuator.

29. A method according to claim 17, wherein said step of generating an estimate of a modal parameter comprises the step of generating an estimate of a force projection parameter that relates a force in an SDOF system to an excitation applied to the conduit.

30. A method according to claim 29, wherein said step of exciting comprises the step of exciting the conduit according to the generated estimate of the force transformation.

31. A method according to claim 17, wherein said step of exciting is preceded by the step of estimating a plurality of modes of the sensor; and wherein said step of exciting comprises the step of applying an excitation to conduit that is operative to preferentially excite one of the estimated modes.

32. A method according to claim 17, wherein said step of generating an estimate of a modal parameter is followed by the steps of:

containing a material from the material processing system in the conduit;

receiving a plurality of motion signals from the plurality of motion transducers; and generating an estimate of a process parameter for the material processing system responsive to the estimate of the modal parameter.

33. A method according to claim 32, wherein said step of generating a process parameter comprises the step of estimating mass flow through the conduit.

34. A method according to claim 32, wherein said step of generating an estimate of a process parameter is followed by the steps of:

generating a new estimate of the modal parameter;

containing a material from the material processing system in the conduit;

receiving a plurality of motion signals from the plurality of motion transducers; and generating an estimate of a process parameter responsive to the new estimate of the modal parameter.

* * * * *

UNITED STATES PATENT AND TRADEMARK OFFICE
CERTIFICATE OF CORRECTION

PATENT NO. : 6,347,293 B1
DATED : February 12, 2002
INVENTOR(S) : Timothy J. Cunningham and Stuart J. Shelley It is certified that error appears in the above-identified patent and that said Letters Patent is hereby corrected as shown below:

<u>Column 4,</u>
Line 62, replace "parameter sensor according to the present invention. The"
with -- parameter sensor 5 according to the present invention. The --

<u>Column 12,</u>
Line 31, replace "estimated modal response $\hat{\eta}_k$ and a "true" modal response $\hat{\eta}_k$"
with -- estimated modal response $\hat{\eta}_k$ and a "true" modal response $\eta_k$ --

<u>Column 13,</u>
Line 31, replace "{1}. A reference model for such a case is given by:" with -- {$l$}. A reference model for such a case is given by: --
Line 40, replace "ficients {1}. A corresponding reference modal coordinate" with
-- ficients {$l$}. A corresponding reference modal coordinate --
Line 53, replace "vector {1} to form a weighted average of the $N_l$ reference" with
-- vector {$l$} to form a weighted average of the $N_l$ reference --
Line 64, replace "from the inner product of the modal participation vector {1}" with
-- from the inner product of the modal participation vector {$l$} --

<u>Column 14,</u>
Line 12, replace "participation vector {1}. A trivial solution to be avoided is" with
-- participation vector {$l$}. A trivial solution to be avoided is --
Line 14, replace "{$\omega$} and and force appropriation vector {1} are zero. This" with
-- {$\psi$} and and force appropriation vector {$l$} are zero. This" --
Line 16, replace "to a predetermined number, such as unity. For example, if $1_1$"
with -- to a predetermined number, such as unity. For example, if $l_{,1}$ --

Line 32, replace "This approach has a potential drawback that if the $1_1$"
with -- This approach has a potential drawback that if the $l_{,1}$ --

UNITED STATES PATENT AND TRADEMARK OFFICE
CERTIFICATE OF CORRECTION

PATENT NO.    : 6,347,293 B1
DATED         : February 12, 2002
INVENTOR(S)   : Timothy J. Cunningham and Stuart J. Shelley It is certified that error appears in the above-identified patent and that said Letters Patent is hereby corrected as shown below:

Column 14 cont'd,
Lines 19-30, replace "
$$e_k = \begin{Bmatrix} \psi \\ 1 \\ l_2 \\ \vdots \\ l_{N_i} \end{Bmatrix}^T \begin{Bmatrix} -x_k \\ \eta^{r1}_k \\ \eta^{r2}_k \\ \vdots \\ \eta_k^{rN}{}_k \end{Bmatrix}$$

$$= \eta^{r1}_k + \begin{Bmatrix} \psi \\ l_2 \\ \vdots \\ l_{N_i} \end{Bmatrix}^T \begin{Bmatrix} -x_k \\ \eta^{r2}_k \\ \vdots \\ \eta_k^{rN}{}_i \end{Bmatrix}$$ (12)"

with --
$$e_k = \begin{Bmatrix} \psi \\ 1 \\ l_2 \\ \vdots \\ l_{N_i} \end{Bmatrix}^T \begin{Bmatrix} -x_k \\ \eta^{r1}_k \\ \eta^{r2}_k \\ \vdots \\ \eta^{rN_i}_k \end{Bmatrix}$$

$$= \eta^{r1}_k + \begin{Bmatrix} \psi \\ l_2 \\ \vdots \\ l_{N_i} \end{Bmatrix}^T \begin{Bmatrix} -x_k \\ \eta^{r2}_k \\ \vdots \\ \eta^{rN_i}_k \end{Bmatrix}$$ (12)--

Signed and Sealed this

Twenty-eighth Day of January, 2003

JAMES E. ROGAN
*Director of the United States Patent and Trademark Office*